United States Patent
Hodel et al.

(10) Patent No.: US 12,460,375 B2
(45) Date of Patent: Nov. 4, 2025

(54) SYSTEMS AND METHODS FOR CONTROLLING A DIGGING MACHINE AND POSITIONING A TRANSPORT VEHICLE

(71) Applicant: Caterpillar Inc., Peoria, IL (US)

(72) Inventors: Benjamin J. Hodel, Dunlap, IL (US); Adam M. Nackers, Washington, IL (US); Justin Lee Steinlage, Mackinaw, IL (US)

(73) Assignee: Caterpillar Inc., Peoria, IL (US)

( * ) Notice: Subject to any disclaimer, the term of this patent is extended or adjusted under 35 U.S.C. 154(b) by 299 days.

(21) Appl. No.: 18/319,363

(22) Filed: May 17, 2023

(65) Prior Publication Data
US 2024/0384499 A1 Nov. 21, 2024

(51) Int. Cl.
*E02F 3/43* (2006.01)
*E02F 3/32* (2006.01)
*E02F 9/26* (2006.01)
*G08G 1/04* (2006.01)

(52) U.S. Cl.
CPC .............. *E02F 3/437* (2013.01); *E02F 9/262* (2013.01); *G08G 1/04* (2013.01); *E02F 3/32* (2013.01)

(58) Field of Classification Search
CPC ... E02F 3/437; E02F 9/262; E02F 3/32; E02F 9/205; E02F 9/265; G08G 1/04
See application file for complete search history.

(56) References Cited

U.S. PATENT DOCUMENTS

| | | | |
|---|---|---|---|
| 6,157,889 A | 12/2000 | Baker | |
| 6,502,016 B1 * | 12/2002 | Ozaki | G05D 1/0259 |
| | | | 73/178 R |
| 9,052,716 B2 | 6/2015 | Tanaka et al. | |
| 9,519,288 B2 | 12/2016 | Friend | |
| 10,289,112 B2 | 5/2019 | Samaraweera | |
| 11,399,462 B2 | 8/2022 | Suleman | |
| 2012/0095640 A1 * | 4/2012 | Lehtinen | E02F 3/434 |
| | | | 701/25 |
| 2012/0130599 A1 * | 5/2012 | Faivre | E02F 9/265 |
| | | | 701/50 |
| 2012/0136523 A1 * | 5/2012 | Everett | E02F 9/2054 |
| | | | 701/24 |
| 2013/0173109 A1 * | 7/2013 | Hukkeri | G05D 1/0891 |
| | | | 701/23 |
| 2014/0214235 A1 * | 7/2014 | Kini | E02F 9/205 |
| | | | 701/2 |
| 2014/0261152 A1 * | 9/2014 | Tanaka | E02F 9/265 |
| | | | 116/230 |
| 2014/0316665 A1 * | 10/2014 | Hargrave, Jr. | E02F 9/261 |
| | | | 340/436 |
| 2015/0376869 A1 * | 12/2015 | Jackson | E02F 9/2054 |
| | | | 701/2 |

(Continued)

*Primary Examiner* — Mussa A Shaawat (57) ABSTRACT

A control system for a machine includes a machine body, a linkage assembly, an implement coupled to the machine body via the linkage assembly, one or more perception systems on the machine, and a controller in communication with the one or more perception systems. The controller is configured to receive one or more signals defining a dig region, define one or more dump regions based at least on the dig region and information from the one or more perception systems, and identify a position of a haul truck relative to the defined one or more dump regions.

20 Claims, 6 Drawing Sheets

(56) References Cited

U.S. PATENT DOCUMENTS

| | | | |
|---|---|---|---|
| 2016/0054114 A1* | 2/2016 | Crozier | G01S 17/88 |
| | | | 702/151 |
| 2017/0073935 A1* | 3/2017 | Friend | E02F 9/265 |
| 2017/0114519 A1* | 4/2017 | Hague | G05B 19/402 |
| 2018/0088591 A1* | 3/2018 | Friend | G05D 1/0291 |
| 2020/0239244 A1* | 7/2020 | Hendricks | B60P 1/283 |
| 2020/0283993 A1* | 9/2020 | Minagawa | E02F 9/205 |
| 2021/0148086 A1* | 5/2021 | Ready-Campbell | E02F 3/439 |
| 2021/0149391 A1* | 5/2021 | Ready-Campbell | E02F 9/225 |

* cited by examiner

SYSTEMS AND METHODS FOR CONTROLLING A DIGGING MACHINE AND POSITIONING A TRANSPORT VEHICLE

TECHNICAL FIELD

This disclosure relates generally to a digging machine and a transport vehicle, and more particularly to systems and methods of controlling the digging machine under remote control operation, and positioning a transport vehicle.

BACKGROUND

Machines are used for moving material between locations or onto transport vehicles at a work site. For example, rope shovels, mining shovels, hydraulic shovels, and hydraulic excavators may move material using rotational movement while transport vehicles or material carrying machines, such as haul trucks, may be loaded with the material, and then move the material by driving along a path or road. Machines using such rotational capabilities may dig material with a material engaging work implement at a dig site and rotate the work implement to a dump or truck load site, at which the work implement is dumped or unloaded into a transport vehicle, such as a haul truck. The transport vehicle must be positioned to the dump or truck load site. In some aspects, the transport vehicle may be manually operated, while the digging machine is operated remotely (e.g., semi-autonomously). The transport vehicle may then be propelled to another location, at which the material is dumped or discharged from the machine. The process of moving material may be repeated numerous times in order to move the desired amount of material. Furthermore, positioning and/or spotting the transport vehicle may be manually intensive and/or time consuming. Additionally, positioning and/or spotting multiple transport vehicles, for example, during a larger digging and dumping process at the work site, may further require operator intervention and/or delay the process.

U.S. Pat. No. 9,052,716 to Wataru ("the '716 patent") discloses a dump truck parking position/direction indication system and a hauling system. The systems of the '716 patent allow the operator of a loading machine to determine a parking position and a parking direction of a dump truck. However, the systems of the '716 patent require a number of detection and calculation devices to determine the parking position and the parking direction of the dump truck based on a movement locus calculated by a locus calculation device. Moreover, the systems of the '716 patent require an output device that outputs the parking position and the parking direction of the dump truck, for example, such that the output information is displayed on a monitor in a cab of the dump truck. As such, the systems of the '716 patent may require additional equipment (e.g., communication and display equipment), both on the loading machine and on the dump truck.

Aspects of the present disclosure may solve one or more of the problems set forth above and/or other problems in the art. The scope of the disclosure, however, is not defined by the ability to solve any specific problem.

SUMMARY OF THE DISCLOSURE

According to one aspect of the present disclosure, a control system for a machine may include a machine body, a linkage assembly, an implement coupled to the machine body via the linkage assembly, one or more perception systems on the machine, and a controller in communication with the one or more perception systems. The controller may be configured to receive one or more signals defining a dig region, define one or more dump regions based at least on the dig region and information from the one or more perception systems, and identify a position of a haul truck relative to the defined one or more dump regions.

In another aspect, a method of operating a machine with a bucket may include determining a dump zone. Determining the dump zone may include using one or more perception systems on the machine to define a dump zone within a range of the bucket. The method may also include positioning the bucket above a center of the dump zone and calling a haul truck. The method may also include determining dimensions of a bed of the haul truck, and calculating an overlap and/or coverage of the bed of the haul truck with the determined dump zone. The method may further include signaling the haul truck to stop, and verifying that the overlap and/or coverage of the bed of the haul truck with the determined dump zone is above a threshold.

In yet another aspect, a digging machine may include a machine body, a linkage assembly, a bucket movably coupled to the machine body via the linkage assembly, at least one perception system on the machine, and a controller. One of the at least one perception system may be positioned on the machine body or on the linkage assembly. The controller may be in communication with the at least one perception system. The controller may be configured to receive one or more signals defining a dig region, define one or more dump regions based at least on the dig region and information from the one or more perception systems, and identify and evaluate a position of a haul truck relative to the defined one or more dump regions.

BRIEF DESCRIPTION OF THE DRAWINGS

The accompanying drawings, which are incorporated in and constitute a part of this specification, illustrate various exemplary embodiments, and together with the description serve to explain the principles of the disclosed embodiments.

DETAILED DESCRIPTION

Reference will now be made in detail to specific embodiments or features, examples of which are illustrated in the accompanying drawings. Generally, corresponding or similar reference numbers will be used, when possible, throughout the drawings to refer to the same or corresponding parts. Features in the drawings may not be drawn to scale, but may rather be drawn to highlight different aspects of the disclosure. In this disclosure, relative terms, such as, for example, "about," "generally," and "substantially" are used to indicate a possible variation of ±10% in a stated numeric value.

Figure 1A:
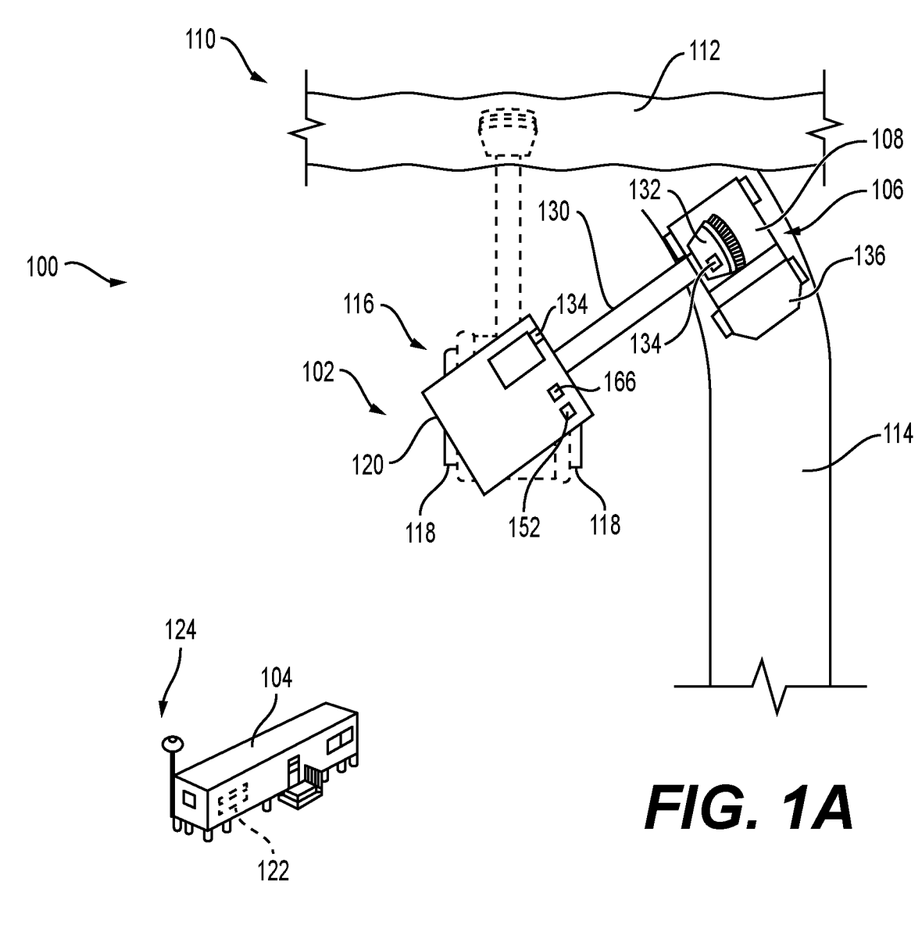
FIG. 1A illustrates an exemplary system, including a digging machine, a transport vehicle, and a remote control site on a work site.

FIG. 1A illustrates an exemplary excavation or digging system 100, which includes a machine 102 and a remote control site 104. Remote control site 104 may be controlled by one or more operators, for example, at a remote control station or operator station 122 (e.g., a remote control console), to operate machine 102 on a work site 110. In some aspects, remote control site 104 may include a wireless communication system 124, which may allow remote control site 104 to be in wireless communication with one or more aspects of machine 102. Machine 102 may be a digging machine, for example, an excavator (e.g., a hydraulic excavator), a rope shovel, a mining shovel, a hydraulic shovel, etc. Machine 102 may move material from a dig site 112 on work site 110 to one or more transport vehicles, for example, haul trucks 106 or other transport vehicles. For example, as discussed in detail below, one or more of portions of machine 102 and/or haul truck 106 may be positioned such that machine 102 loads material from work site 110 into a bed 108 of haul truck 106. Once haul truck 106 and its bed 108 have been positioned and spotted, machine 102 may perform an autonomous (i.e., fully autonomous) or semi-autonomous digging and dumping operation. Work site 110 may be a portion of, for example, a construction site, a road work site, a quarry, a mine site, a landfill, or any other type of work site.

As discussed in detail below, one or more operators at remote control site 104 may remotely operate machine 102, for example, via a non-line-of sight ("non-LOS") control or via a line-of-sight ("LOS") control (e.g., remote from machine 102 but within sight of machine 102). Moreover, the one or more operators at remote control site 104 may perform one or more operations to define a dig region. The one or more operators may also define a dumping region (e.g., at least a portion of bed 108 of haul truck 106). Based on the operator input, machine 102 may autonomously or semi-autonomously perform the digging and dumping operation. As discussed in detail below, the digging and dumping operation may continue for a predetermined amount of time, a predetermined number of digs, until a predetermined amount (e.g., volume, weight, etc.) of material has been moved, until there are one or more error or warning conditions, other notification(s), etc.

Machine 102 includes an undercarriage 116, for example, including one or more ground engaging elements or tracks 118. Machine 102 also includes a machine body 120, which may be rotatable relative to undercarriage 116. Moreover, machine 102 includes a linkage assembly 130, for example, coupling a work implement or bucket 132 to machine body 120. Linkage assembly 130 may include one or more booms and sticks, such that linkage assembly 130, and thus bucket 132, is movable relative to machine body 120. Linkage assembly 130 and/or bucket 132 may be movable via respective hydraulic cylinder(s). As discussed here, various aspects of machine 102 may be movable or otherwise controlled, both via remote operator control and via autonomous control, to perform various digging or earth moving operations.

Furthermore, machine 102 may include one or more perception systems 134, for example, positioned on one or more portions of machine body 120 or otherwise on machine 102, which may help the remote operator control, for example, in non-LOS control. The one or more perception systems 134 may include one or more light detection and ranging systems (LIDAR), one or more stereo camera systems, etc. The one or more perception systems 134 may be positioned on one or more portions of machine body 120 (e.g., on or in front of a cab or forward portion of machine body 120, with bucket 132 and/or linkage assembly 130 in a field of view), on one or more portions of bucket 132, on one or more portions of linkage assembly 130, or on one or more other portions of machine 102. In these aspects, and as discussed below, perception system(s) 134 may obtain sensor data (e.g., image data) and/or process sensor data to extract or otherwise determine an estimate of a position (e.g., pose, orientation, etc.) of one or more haul trucks 106 relative to machine 102.

Figure 1B:
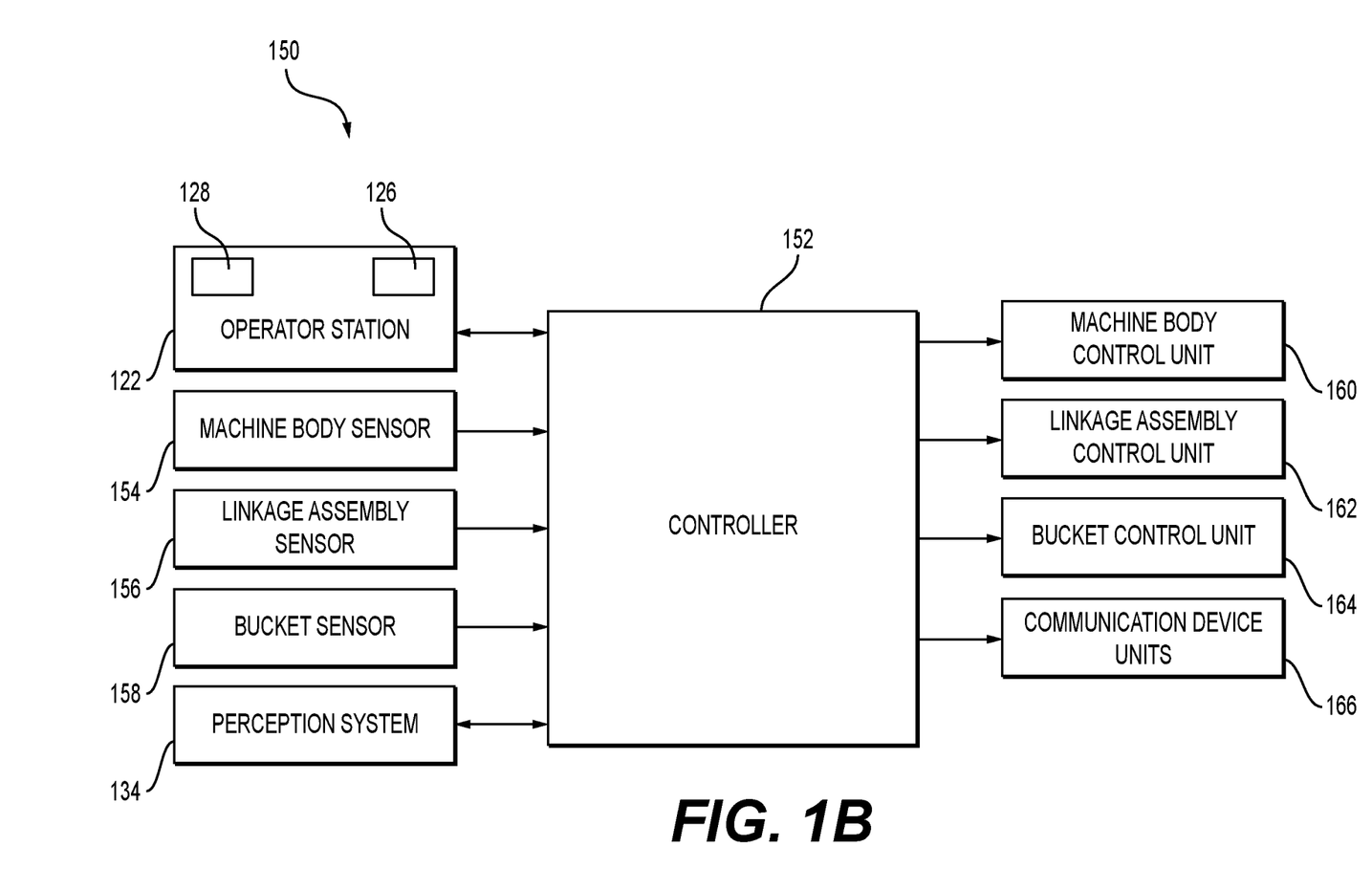
FIG. 1B illustrates an exemplary control system.

Additionally, machine 102 includes a controller 152, for example, in communication with operator station 122 via wireless communication system 124. In these aspects, as shown in FIG. 1B, controller 152 is a part of a control system 150. Controller 152 may be coupled to one or more sensors, control systems, actuators, etc., in order to help control the position of bucket 132 relative to machine body 120 and/or also control the position of machine body 120 relative to undercarriage 116. Controller 152 may receive one or more inputs, and emit one or more outputs, for example, to help position bucket 132 and/or machine body 120. Furthermore, controller 152 may receive one or more operator inputs, for example, during the remote operator control. Controller 152 may also emit one or more outputs during the autonomous control to help control the position and/or operation of machine body 120, linkage assembly 130, bucket 132, etc. Additionally, controller 152 may be in communication with perception system(s) 134. In this aspect, controller 152 may receive one or more inputs from perception system(s) 134, and emit one or more outputs to perception system(s) 134, for example, to help spot and/or position one or more haul trucks 106.

For example, as shown in FIG. 1B, control system 150 includes controller 152, which may receive one or more inputs from the one or more operators at operator station 122. Controller 152 may include control logic and/or instructions for both remote operator control and autonomous control. Alternatively or additionally, in some aspects, controller 152 may receive one or more inputs to control autonomous control operation, for example, autonomous control inputs from an autonomy or autonomous control electronic control module. Although not shown, the autonomy or autonomous control electronic control module may be incorporated in controller 152 or may be separate from controller 152. Additionally, machine 102 may include a plurality of sensors in communication with controller 152. For example, machine 102 may include a machine body sensor 154, for example, configured to detect and/or provide information regarding the position of machine body 120 relative to undercarriage 116 and/or the pitch and/or roll of machine body 120, for example, relative to an inertial frame. Machine 102 may also include one or more linkage assembly sensors 156, for example, configured to detect and/or provide information regarding the position of one or more portions of linkage assembly 130 relative to machine body 120. Additionally, machine 102 may include one or more bucket sensors 158, for example, configured to detect and/or provide information regarding the position and/or orientation of one or more portions of bucket 132, for example, relative to linkage assembly 130 and/or machine body 120. One or more of machine body sensor 154, linkage assembly sensor(s) 156, and/or bucket sensor(s) may be inertial measurement units (IMUs), hydraulic cylinder displacement sensors, joint angular sensors, or other appropriate sensors to measure the position and/or orientation of respective portions of machine 102.

In these aspects, controller 152 may also be in communication with one or more control units in control system 150. For example, controller 152 may be in communication with a machine body control unit 160, for example, configured to control a position of machine body 120 relative to undercarriage 116. Controller 152 may be in communication with a linkage assembly control unit 162, for example, configured to control a position of one or more portions of linkage assembly 130 relative to machine body 120. Additionally, controller 152 may be in communication with a bucket control unit 164, for example, configured to control a position of one or more portions of bucket 132 relative to linkage assembly 130 and/or machine body 120. In these aspects, control system 150 and controller 152 may help to control the position and/or operation of machine 102, for example, machine body 120, linkage assembly 130, and/or bucket 132, when operating in a remote control operation mode and/or when operating in an autonomous control mode. For example, control system 150 may receive inputs and emit outputs to control the operation of machine body 120, linkage assembly 130, and/or bucket 132 to dig, dump, or otherwise move material from work site 110, for example, to bed 108 of one or more haul trucks 106, when operating in the remote control operation mode and/or when operating in the autonomous control mode. Furthermore, as discussed herein, control system 150 may receive one or more inputs or signals when operating in the remote control operation mode in order to establish operating parameters for when operating in the autonomous control mode.

Additionally, as shown in FIG. 1B, operator station 122 may include one or more displays 126 and one or more user interfaces 128. Display(s) 126 may receive signals (e.g., video or image signals) from perception system(s) 134 or other sensors on or near machine 102. For example, display(s) 126 may be in communication with perception system(s) 134 or other sensors via controller 152. In these aspects, as discussed in detail below, the operator may signal machine 102 to perform one or more operations, for example, via one or more user interface(s) 128 based on the operator's observances via perception system(s) 134 and display(s) 126. Additionally, the operator may signal, via controller 152, one or more communication device units 166 on machine 102, for example, to provide one or more signals to haul truck 106. In these aspects, the operator may signal one or more communication device units 166 to emit one or more audible signals (e.g., honk or otherwise operate a horn or other audible device on machine 102), one or more visible signals (e.g., illuminate, flash, or otherwise operate one or more lights on machine 102), etc.

Although not shown, controller 152 may be coupled to or include one or more memory units, which may contain instructions for controller 152 to help control a position or movement of one or more of machine body 120, linkage assembly 130, and/or bucket 132. Controller 152 may also be coupled to or include one or more memory units, which may contain instructions for controller 152 to help operate and/or analyze data from perception system(s) 134. Controller 152 may be a separate controller on machine 102, or may be integrated into a central vehicle controller (e.g., a main power controller, an operation controller, etc.). Alternatively, controller 152 may be integrated into one or more of control or management systems or modules (e.g., for operating the engine) of machine 102, or another dedicated control module on machine 102. In one aspect, machine 102 may be an electrohydraulic excavator, and controller 152 may control one or more electrical switches or valves in order to control one or more hydraulic cylinders or electrical elements in order to operate machine 102.

Controller 152 may include one or more microprocessors. For example, controller 152 may embody a single microprocessor or multiple microprocessors. The one or more microprocessors of controller 152 may be configured to perform any of the operations mentioned herein. For example, controller 152 may include a memory, a secondary storage device, a processor, such as a central processing unit or any other means for accomplishing a task consistent with the present disclosure. The memory or secondary storage device associated with controller 152 may be non-transitory computer-readable media that store data and/or software routines that may assist controller 152 in performing its functions, such as the functions of process or method 400 of FIG. 4, as discussed below. Further, the memory or secondary storage device associated with controller 152 may also store data received from the various inputs or sensors associated with machine 102. Numerous commercially available microprocessors can be configured to perform the functions of controller 152. It should be appreciated that controller 152 could readily embody a general machine controller capable of controlling numerous other machine functions. Various other known circuits may be associated with controller 152, including signal-conditioning circuitry, communication circuitry, hydraulic or other actuation circuitry, and other appropriate circuitry.

FIGS. 2A-2D are top views of machine 102 performing various steps in a transport vehicle spotting and positioning procedure for a digging and dumping operation. As discussed above, the digging and dumping operation includes positioning and/or maneuvering one or more of undercarriage 116, tracks 118, machine body 120, linkage assembly 130, and/or bucket 132. For example, machine 102 may be positioned to a digging location by controlling tracks 118 and/or positioning machine body 120 relative to undercarriage 116. Moreover, linkage assembly 130 and/or bucket 132 may be positioned and/or maneuvered such that bucket 132 may engage with and dig the ground or material at dig site 112 (FIG. 1A). Further, one or more of machine body 120, linkage assembly 130, and/or bucket 132 may be re-positioned and/or maneuvered to deliver the dug material to the dump site, for example, bed 108 of haul truck 106 (FIG. 1A). As mentioned, this positioning and/or maneuvering may be performed by an operator, for example, a remote operator, using either line of sight or non-line of sight remote control. Furthermore, in some aspects, this positioning and/or maneuvering may be performed autonomously or semi-autonomously, for example, via controller 152 and/or one or more other components of control system 150.

Figure 2A:
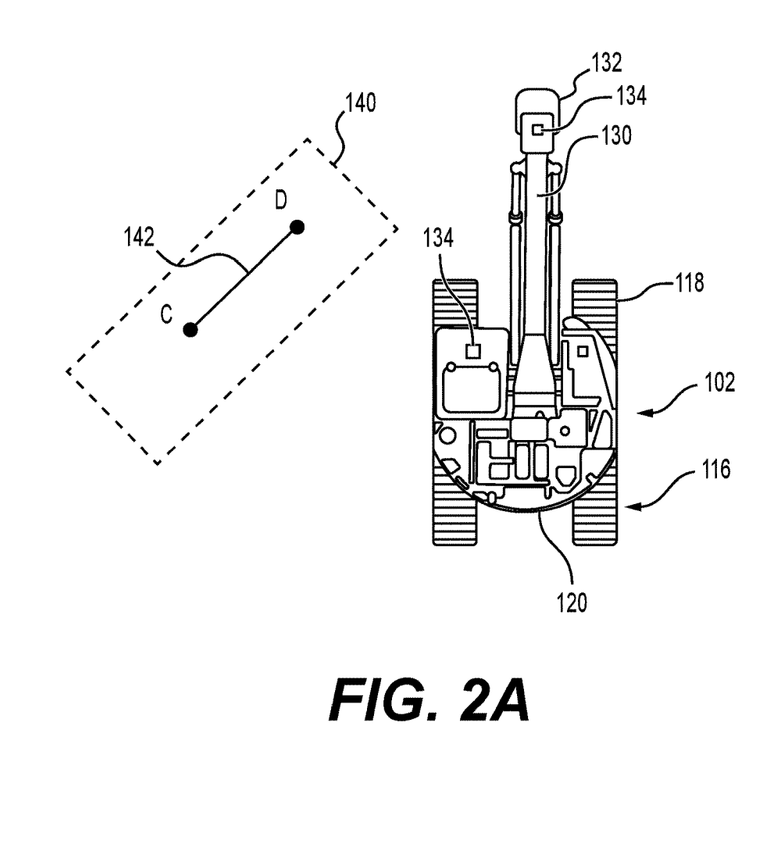
FIGS. 2A-2D are top views of the machine of FIG. 1A performing various steps in a transport vehicle spotting and positioning procedure.

As shown in FIG. 2A, the operator or controller 152 (e.g., in an autonomous or semi-autonomous operation mode) may define a desired or target truck pose 140 (truck pose 140) and/or a desired or target dump line 142 (dump line 142). Truck pose 140 may correspond to a position adjacent to machine 102, for example, at least partially overlapping with a swivel range (see, e.g., bucket range 200 in FIG. 3) of machine 102. The swivel range may correspond to the position range of bucket 132, for example, based on the positioning and/or orientation of machine body 120 relative to undercarriage 116 and/or the positioning and/or orientation of linkage assembly 130. Moreover, the truck pose 140 may be determined by controller 152, for example, based on data received from perception system(s) 134. Controller 152 may estimate or otherwise identify truck pose 140 such that the position and orientation of truck pose 140 is both accessible from a road 114 (FIG. 1A) and reachable by bucket 132, that is, within the swivel range as discussed above. Moreover, controller 152 may estimate or otherwise identify dump line 142 based on the data received from perception system(s) 134. For example, controller 152 may determine a front end C and a rear end D of dump line 142. Front end C may correspond to a front of bed 108, for example, spaced away from an actual front of bed 108 in order to provide a spacing to avoid bucket 132 dumping material on cab 136. Rear end D may correspond to a rear of bed 108, for example, spaced away from an actual end of bed 108 in order to provide a spacing to avoid bucket 132 dumping material on the ground surface beneath or around bed 108. Thus, dump line 142 may extend between front end C and rear end D, for example, corresponding to a mid-line of a bed of a truck in a position corresponding to truck pose 140. In some aspects, controller 152 may only identify one dump position, for example, a central position in a small bed.

Figure 2B:
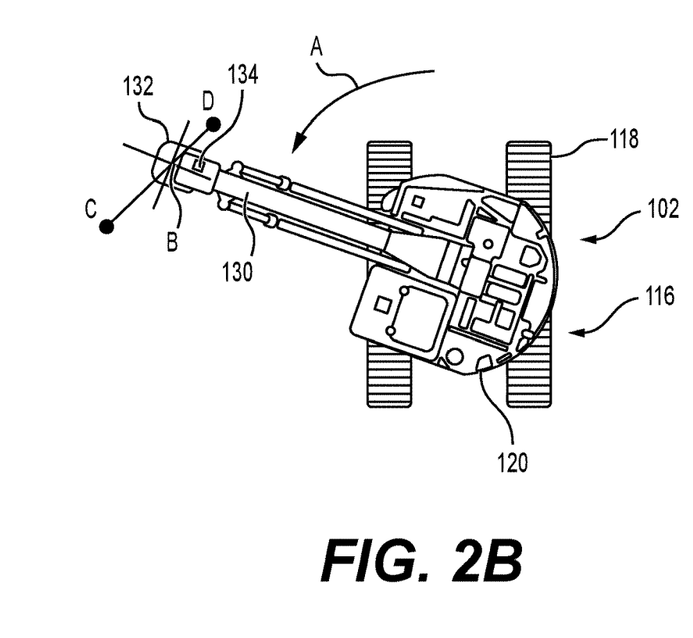

As shown in FIG. 2B, one or more aspects of machine 102 may be positioned and/or maneuvered in order to position bucket 132 to overlap with dump line 142 and/or truck pose 140. For example, machine body 120 may be rotated relative to undercarriage 116 in direction A. As such, linkage assembly 130 and bucket 132 are also rotated in direction A, for example, away from the dig site. In these aspects, at least a portion of bucket 132 may intersect with or otherwise overlap with dump line 142, for example, at location B. Location B (i.e., with bucket 132 intersecting or overlapping with dump line 142) may correspond to a position of bucket 132 at a first dump into bed 108. Bucket 132 in location B may also provide a target for the positioning of haul truck 106, for example, for an operator (e.g., in cab 136 or remote) or autonomous controller of haul truck 106.

Figure 2C:
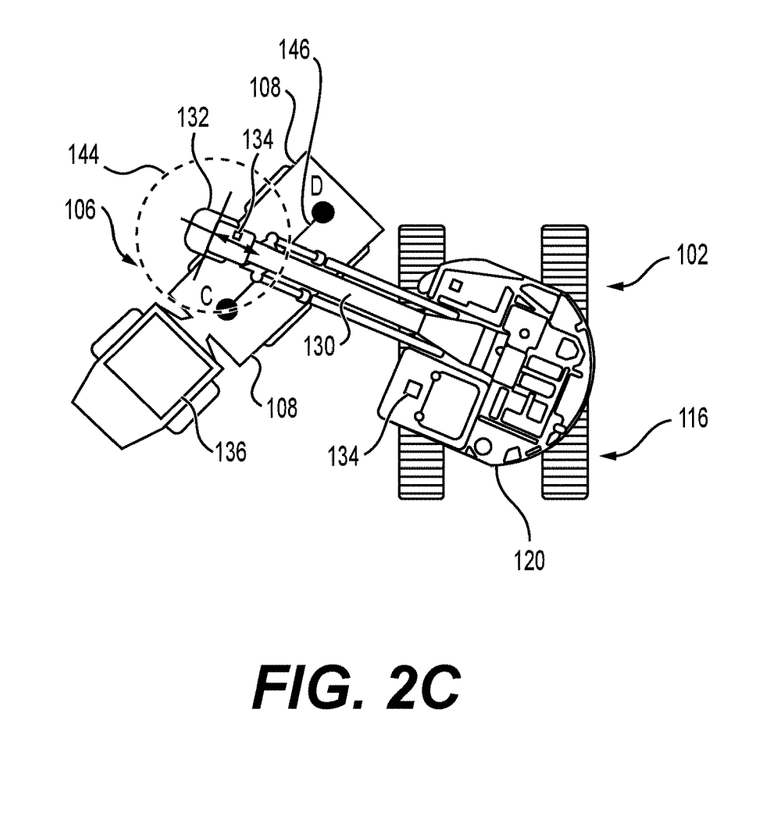

Further, as shown in FIG. 2C, haul truck 106 may be backed up (e.g., in reverse) or drive by (e.g., forward). It is noted that whether haul truck 106 is backed up or drives by to be positioned in line with truck pose 140 and/or dump line 142 (FIGS. 2A and 2B) may depend on the terrain of work site 110 (FIG. 1A). For example, if there is a trench of other unpassable terrain forward of machine 102, then haul truck 106 will be backed up to the position to receive material from machine 102. Alternatively, if the terrain forward of machine 102 is passable, then haul truck 106 may be driven past machine 102 to the position to receive material from machine 102.

Nevertheless, haul truck 106 may be positioned such that at least a portion of bed 108 is below bucket 132. For example, haul truck 106 may be positioned such that a midline 146 of bed 108 is aligned with bucket 132, for example, under location B (FIG. 2B). In some aspects, machine 102 may signal haul truck 106 when haul truck 106 is adequately positioned relative to bucket 132. In these aspects, machine 102 may signal haul truck 106 when haul truck 106 is adequately positioned, for example, as determined by optimizing an overlap of the intended dump zone with bed 108 of haul truck 106, as detailed below with respect to method 400. For example, the remote operator and/or controller in an autonomous control may activate one or more communication device units 166 in order to emit one or more signals. The one or more signals may be a honk of a horn on machine 102, a change a status (e.g., flash, turn on, turn off, change color, etc.) of a light, etc.

In some aspects, the positions of bucket 132 and/or bed 108 may not be properly aligned. For example, as shown, bucket 132 may be positioned above a far edge of bed 108. In some of these aspects, bucket 132 may be within a tolerance or adjustable zone 144. For example, tolerance or adjustable zone 144 may be an area (e.g., a circular area) through which bucket 132 may be repositioned (e.g., via extension or retraction movement of linkage assembly 130, via swinging or rotation of machine body 120, etc.) to position bucket 132 over a midline or otherwise over an appropriate portion of bed 108 of haul truck 106. The size and/or shape of adjustable zone 144 may depend on the position and/or arrangement of one or more portions of linkage assembly 130, the size and/or shape of bucket 132, the terrain upon which machine 102 is operating, etc. As shown in FIG. 2C, bucket 132 is not positioned over midline 146, but at least a portion of midline 146 is within adjustable zone 144. For example, each planned dump point (e.g., point B in FIG. 2D) may include an adjustable zone. Controller 152 may determine, for example, via information or data from perception system(s) 134, that all or a majority of points or positions along dump line 142 fall with a collective region of those planned dump points. Accordingly, haul truck 106 may not need to be repositioned. In these aspects, if needed, bucket 132 may be repositioned to be over dump line 142. Alternatively, although not shown, if midline 146 is not within adjustable zone 144, machine 102 may initiate an exception process. For example, as discussed below, the exception process may include machine 102 emitting one or more signals (e.g., honks, lights, etc.) in order to indicate to haul truck 106 (e.g., to the driver of haul truck 106) to reposition haul truck 106 such that bed 108 is positioned or otherwise oriented in accordance with bucket 132 and midline 146 of bed 108 of haul truck 106.

Figure 2D:
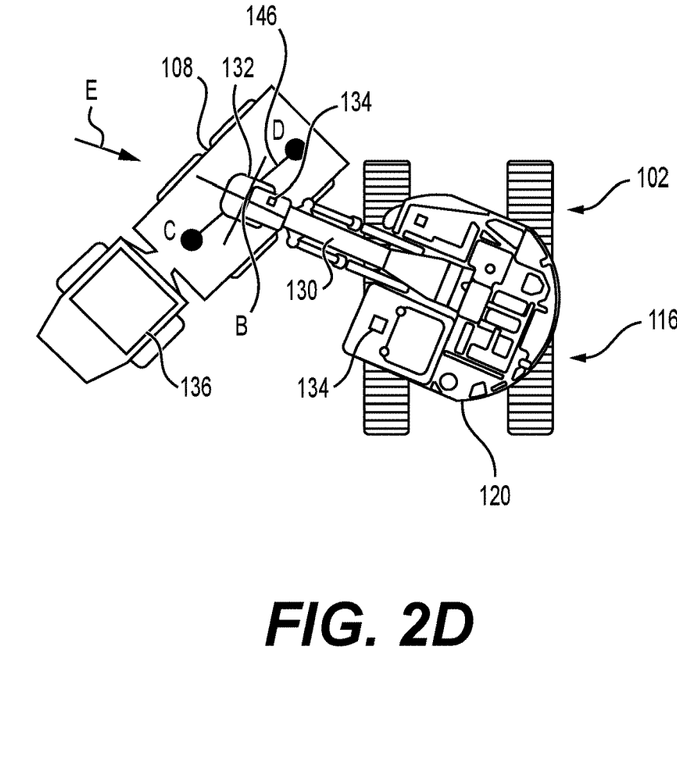

As shown in FIG. 2D, with midline 146 within adjustable zone 144, bucket 132 may be repositioned to be positioned over midline 146. In this aspect, one or more portions of linkage assembly 130 may be repositioned (e.g., extended or retracted) or reoriented, for example, in direction E, such that bucket 132 intersects or at least partially overlaps with midline 146, for example, at location B. Accordingly, machine 102 may account for the variance between the initial position of bucket 132 for the dumping and the position of bed 108 of haul truck 106. Machine 102 may then dump material from dig site 112 into bed 108. Moreover, machine 102 (e.g., via controller 152) may store the position of bed 108, for example, storing the position of front and rear ends of bed 108. In this aspect, machine 102 may perform an autonomous or semi-autonomous digging and dumping procedure. It is noted that machine 102 may dump material in various locations of bed 108. For example, machine 102 may dump material in spaced increments along midline 146. Alternatively or additionally, machine 102 may dump material on both sides of dump line 146. The digging and dumping procedure may proceed with dumping loads to incremental and/or distributed locations along midline 146 within bed 108 of haul truck 106 until a target payload and/or volume is reached.

Figure 3:
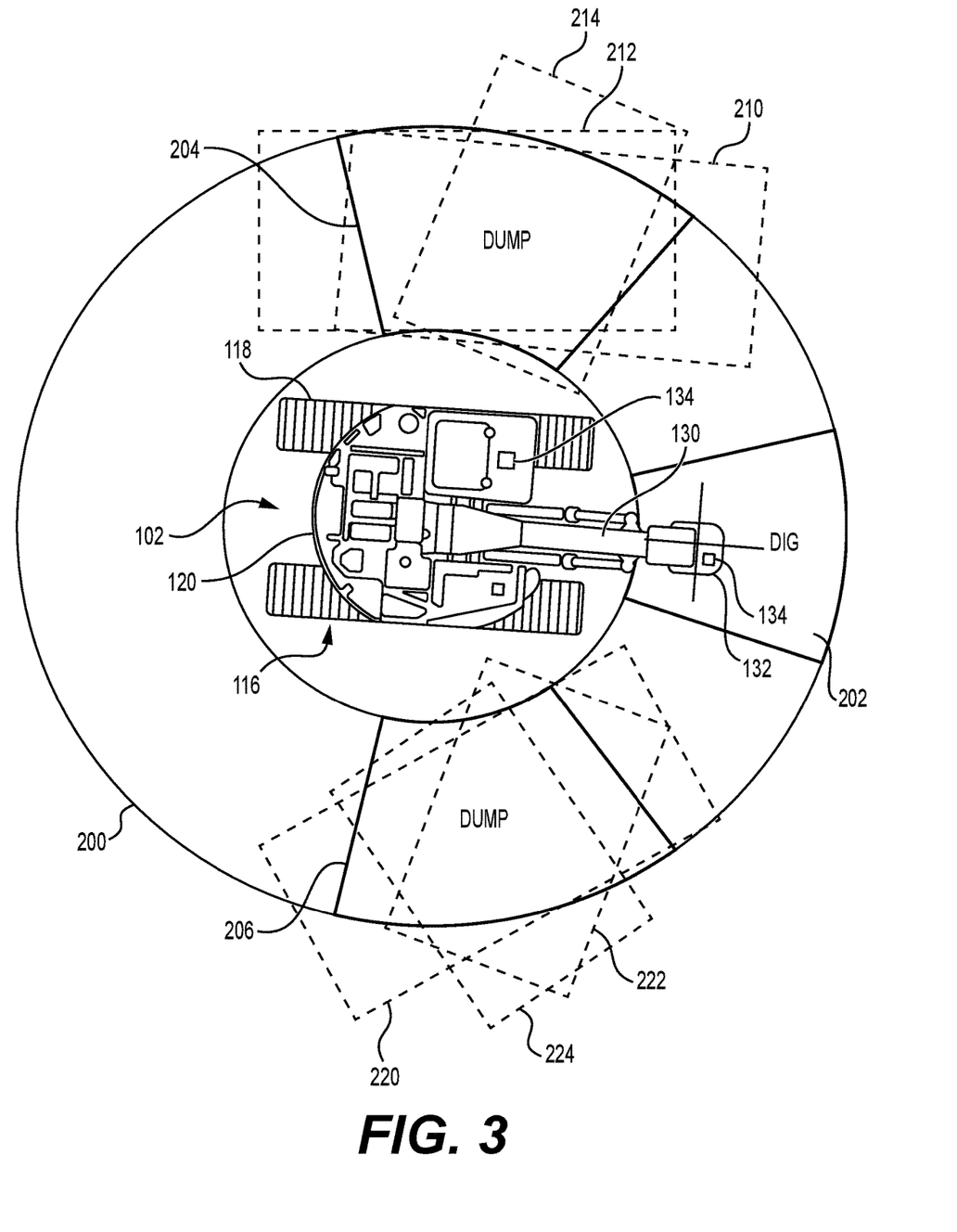
FIG. 3 is a top view of the machine of FIG. 1A and various aspects of a transport vehicle spotting and positioning procedure.

FIG. 3 illustrates a top view of machine 102 and a plurality of truck bed positions. Moreover, as mentioned machine 102 includes a bucket range 200, and machine 102 may dig at a dig zone 202 with bucket 132 and linkage assembly 130. Bucket range 200 may be generally annular, for example, formed by an inner circle and an outer circle indicative of the range of motion of linkage assembly 130 and bucket 132 relative to machine body 120 and/or the range of motion of machine body 120 relative to undercarriage 116 and tracks 118. Moreover, machine 102, for example, via controller 152, may determine one or more dump zones, for example, a first dump zone 204 and another or second dump zone 206. Dump zones 204, 206 may be segments of bucket range 200, for example, with dump zone 204 spaced away from dig zone 202 in a first direction (e.g., counterclockwise) and with dump zone 206 spaced away from dig zone 202 in a second direction (e.g., clockwise).

Additionally, machine 102, for example, via controller 152, may determine dimensions of a bed of a haul truck. As discussed below, controller 152 may determine dimensions of bed 108 of haul truck 106 based on data or information received from one or more of perception systems 134. Machine 102 (e.g., via controller 152) may calculate (e.g., continuously calculate) an overlap and/or coverage (e.g., as a percentage) of the bed of the haul truck with dump zones 204, 206. In these aspects, dump zones 204, 206 may be segments of the annular bucket range 200, and beds may be rectangular. Controller 152 may output one or more signals indicative of the overlap and/or coverage of the bed of the haul truck with one of dump zones 204, 206. The overlap and/or coverage may increase as the truck travels into one of dump zones 204, 206 (e.g., as the truck backs up), and the overlap and/or coverage may decrease as the truck travels out of the one of dump zones 204, 206. In these aspects, FIG. 3 illustrates a plurality of truck bed positions (e.g., first truck bed 210, second truck bed 212, and third truck bed 214) relative to dump zone 204, and also illustrates a plurality of truck bed positions (e.g., fourth truck bed 220, fifth truck bed 222, and sixth truck bed 224) relative to dump zone 206. An ideal coverage value (e.g., of 100% overlap) is indicative that the entire truck bed (e.g., 210, 212, 214, 220, 222, 224) is within dump zone 204, 206.

Figure 4:
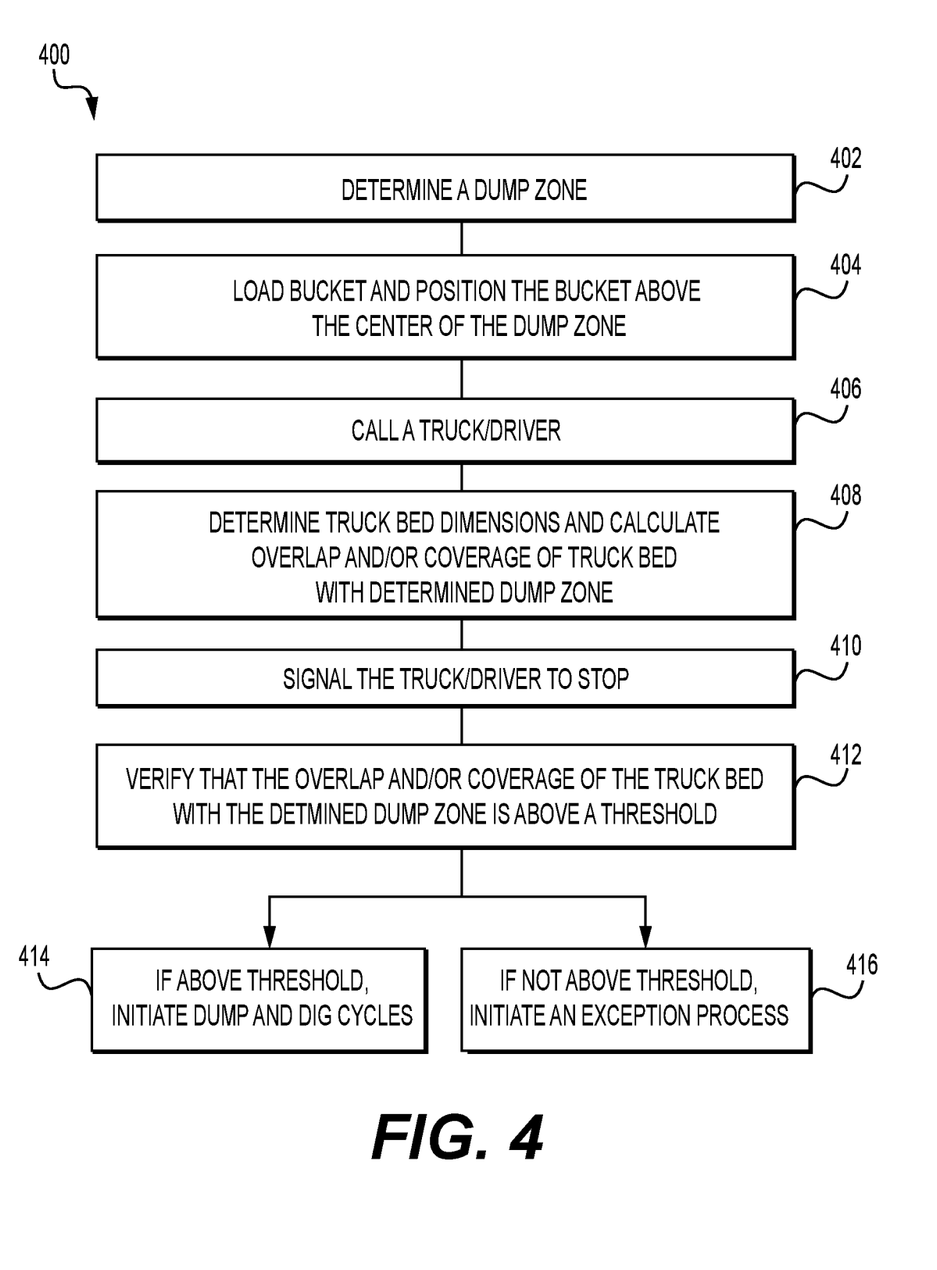
FIG. 4 is a flow diagram of an exemplary transport vehicle spotting and positioning method, using various aspects of the system of FIGS. 1A and 1B.

FIG. 4 illustrates an exemplary method or process 400 that may be performed by one or more components of system 100 and/or control system 150 in order to operate machine 102 and automatically spot and/or position haul truck 106, for example in one or more of a remote operator control mode, an autonomous operation mode, or a semi-autonomous operation mode. An initial step 402 includes determining a dump zone. For example, the remote operator (s) may have maneuvered or otherwise positioned machine 102 to dig site 112 and/or dig zone 202, for example, in an operator remote control mode. For example, the operator(s) at remote control site 104 may tram or otherwise maneuver machine 102 to dig site 112 and/or dig zone 202. This driving or otherwise maneuvering of machine 102 may be performed using a non-LOS control, with the operator(s) relying on the one or more perception systems 134 or sensors on machine 102. Alternatively, the driving or otherwise maneuvering of machine 102 may be performed using LOS control, with the operator(s) being remote from machine 102 but within sight of machine 102. Then, controller 152 may determine a dump zone, for example, an optical dump zone or segment of an annular range of motion (i.e., bucket range 200). In some aspects, controller 152 may determine an optical truck pose 140 and/or dump line 142 within the determined dump zone.

Controller 152 may determine one or more dump zones (e.g., dump zones 204, 206) in order to maximize dig cycle productive (e.g., by minimizing swing of bucket 132, via rotation of machine body 120 relative to undercarriage 116, to and from digs and dumps). Controller 152 may also determine one or more dump zones such that the dump zones are accessible for one or more trucks 106, for example, such that trucks 106 have a clear access path to the dump zones. Moreover, controller 152 may determine one or more dump zones such that the dump zones are reachable for machine 102, for example, within bucket range 200, such that machine 102 is not in danger of tipping or otherwise at a risk of malfunctioning in order to position bucket 132 over the one or more dump zones. Furthermore, as mentioned above, the various determinations discussed herein may be performed using data from one or more perception systems 134.

Next, a step 404 includes positioning the bucket above the center of the determined dump zone. In some aspects, step 404 may include initially loading the bucket (e.g., from a dig zone) before positioning the bucket above the center of the determined dump zone. For example, the operator(s) and/or controller 152 may operate linkage assembly 130 and bucket 132 to perform a first dig at dig site 112 and/or dig zone 202. The operator(s) and/or controller 152 may position one or more of machine body 120, linkage assembly 130, and/or bucket 132 such that bucket 132 is above a determined dump line, for example, midline 146 (FIGS. 2C and 2D) or otherwise above a central portion of dump zone 204 or 206.

A step 406 includes calling a truck and/or a driver of a truck. In this aspect, haul truck 106 may be remotely operated, autonomously operated, or semi-autonomously operated. Alternatively, haul truck 106 may be operated by a driver in cab 136 of haul truck 106. In some aspects, step 406 includes machine 102 honking a first number of times, for example, one time, to call the truck and/or the driver of the truck. Alternatively, step 406 may include machine 102 emitting one or more other indications or signals to call haul truck 106, with or without a driver. In any of these aspects, the truck and/or driver may approach dump zone 204, 206 in reverse, and may be attempting to align a centerline of bed 108 of haul truck 106 with a truck spot location, for example, with bucket 132.

Next, a step 408 includes determining truck bed dimensions and calculating an overlap and/or coverage of the truck bed with the determined dump zone. For example, as discussed above, step 408 includes determining a truck pose 140, for example, including a size and/or orientation of bed 108 of haul truck 106. Truck pose 140 may be determined by controller 152, for example, based on data from one or more perception systems 134. In some aspects, step 408 may include determining an amount of "carryback-material" in bed 108, for example, determining whether and/or how much material remains in bed 108 from a previous carrying and dumping procedure for haul truck 106. Carryback-material is residual material left in bed 108 of haul truck 106 after haul truck 106 dumps (far away from machine 102) the rest of the loaded material when haul truck 106 returns to the dig site for the next load. For example, controller 152 may estimate a volume of carryback-material based on the data from one or more perception systems 134. Controller 152 may also use the estimated carryback volume to set the initial payload or volume estimate (to be higher than zero), which may cause the dump planner to modify where and/or how much material will be dumped into haul truck 106. In these aspects, more carryback material means that less material may be delivered to bed 108 of haul truck 106 to reach the intended payload or volume target, for example, to avoid overloading haul truck 106.

In some aspects, controller 152 may determine truck pose 140, for example, using a geometric method based on information or data (e.g., image or video signals) from one or more perception systems 134. The geometric method may include using edge detection from a time-varying effects ("TVE") model prediction, for example, using information or data from perception system(s) 134. Based on the edge detection, the geometric method may identify a top plane of bed 108 of haul truck 106, may split the top plane in half, for example, approximating midline 146. Additionally, the geometric method may include identifying cab 136 and the rear end of bed 108, and modifying midline 146 such that material is not dumped on cab 136 or otherwise out of bed 108. Moreover, with cab 136 identified, controller 152 may determine or modify a dump plan trajectory such that bucket 132 does not pass over cab 136, for example, helping to avoid material being dumped or portions of machine 102 falling on cab 136. Alternatively or additionally, step 408 may include a machine learning method. The machine learning method may include training a model based on labeled data, for example, by an operator or other human identifying and labeling a plurality of spots or locations in images (e.g., semantically segmented truck shapes, bounding boxes in images, or labeling of a bed midline, four points of truck corners, etc.). The machine learning method may also include performing continuous inferences with the model to predict one or more best or better spotting locations (e.g., predict semantically segmented truck shape, bounding boxes, bed midlines, or corner points), for example, to extract or otherwise identify dump line 142, truck pose 140, midline 146, etc. Alternatively or additionally, controller 152 may determine truck pose 140 using information from one or more wireless vehicle communication devices, for example, including a type and/or size of the vehicle, the global positioning system information for the vehicle, the heading of the vehicle, etc. (e.g., in a V2X or "vehicle to everything" system).

Based on the determined truck pose 140, controller 152 may also include dump line 142, for example, a center midline 146 of bed 108 extending between points C and D. Points C and D may be spaced away from front and rear ends, respectively, of bed 108, which may help to avoid dumping material on cab 136 of haul truck 106 and/or dumping material behind or otherwise outside of bed 108. Furthermore, step 408 includes calculating the overlap and/or coverage of bed 108 of haul truck 106 with the determined dump zone 204, 206. In this aspect, and as discussed above with respect to FIG. 3, when haul truck 106 is backing into dump zone 204, 206, the coverage value is expected to increase as haul truck 106 travels into dump zone 204, 206, and the coverage value is expected to decrease as haul truck 106 travels out of dump zone 204, 206. Controller 152 and/or the one or more operators may monitor the calculated overlap and/or coverage, for example, monitoring the overlap and/or coverage to determine a maximum overlap and/or coverage. As mentioned, an ideal coverage value (e.g., of 100% overlap) is indicative that the entire truck bed (e.g., 210, 212, 214, 220, 222, 224 in FIG. 3) is within dump zone 204, 206. Alternatively, in some aspects, an ideal or desired truck position relative to machine 102 may correspond to when bucket 132 is positioned above or at least partially overlaps with midline 146 in bed 108.

Further, method 400 includes a step 410 that includes signaling the truck/driver to stop. As mentioned, signaling the truck/driver to stop may correspond to a maximum overlap and/or coverage of bed 108 of haul truck 106 within dump zone 204, 206. In some aspects, signaling the truck/driver to stop may correspond to when a rate of change or a derivative (e.g., relative to either time or space) of the overlap of bed 108 of haul truck 106 with dump zone 204, 206 is above a first threshold, for example, indicating that the overlap is increasing. Moreover, signaling the truck/driver to stop may correspond to when the rate of change or derivative of the overlap of bed 108 of haul truck 106 with dump zone 204, 206 falls or drops below a second threshold, for example, indicating that the overlap is decreasing or is increasing at a slower rate. For example, this derivative method may include signaling the truck/driver (e.g., by activating one or more communication device units 166) just before (e.g., in time or space) a maximum overlap of bed 108 of haul truck 106 with dump zone 204, 206 is reached, which may help to ensure that haul truck 106 is stopped at a maximum overlap, and not at an overlap less than or below the maximum overlap. Alternatively, signaling the truck/driver to stop may correspond to midline 146 in bed 108 being positioned below bucket 132. In any of these aspects, signaling the truck/driver may include machine 102 activating one or more communication device units 166, for example, the first number of times (e.g., honking a horn one time) to signal the truck and/or the driver of the truck to stop haul truck 106 within dump zone 204, 206. Alternatively, step 410 may include machine 102 emitting one or more other indications or signals for haul truck 106, with or without a driver, to stop.

Next, a step 412 includes verifying that the overlap and/or coverage of the truck bed with the determined dump zone is above a threshold. For example, step 412 may be performed once machine 102 has perceived that haul truck 106 has stopped. Step 412 may include evaluating the position of haul truck 106 relative to the defined one or more dump zones. Furthermore, as mentioned above, the threshold value may correspond to a size and/or shape of adjustable zone 144. For example, if at least a portion of midline 146 of haul truck 106 is within adjustable zone 144, then the threshold of step 412 may be satisfied. In another aspect, the threshold may correspond to a minimum amount of bed 108 of haul truck 106 (e.g., determined truck beds 210, 212, 214, 220, 222, 224) being positioned within respective dump zones 204, 206. For example, the threshold may correspond to at least 50%, 60%, 70%, 80%, 90%, etc. of bed 108 being positioned within respective dump zones 204, 206.

If the overlap and/or coverage of the truck bed with the determined dump zone meets or is above the threshold, then method 400 proceeds to step 414, in which controller 152 initiates a plurality of dump and dig cycles, for example, to fill bed 108 of haul truck 106. For example, controller 152 may signal machine 102 to dump the load of material from bucket 132 into bed 108. Controller 152 may then signal machine 102 to return bucket 132 to dig zone 202, perform another dig, move bucket 132 to be over bed 108, dump bucket 132, etc. It is noted that controller 152 may signal machine 102 to dump bucket 132 at various positions along dump line 142 or midline 146, for example, between locations C and D. In some aspects, controller 152 may signal machine 102 to dump bucket 132 at various positioned on respective sides of dump line 142 or midline 146. These dig and dump cycles may be performed until bed 108 is full (e.g., as perceived by perception system(s) 134), a predetermined number of digs, a predetermined number of dumps, based on a total payload or volume dug and dumped, etc. In any of these aspects, controller 152 may signal machine 102 to emit one or more signals (e.g., one honk or other signal or indication) when the loading of bed 108 of haul truck 106 is complete. Haul truck 106 may then leave dump zone 204, 206, and a new haul truck may be called (e.g., returning to step 406) to replace the full haul truck. One or more of the above steps may be performed for the new haul truck. The digging and dumping cycles may be suspended, for example, with bucket 132 in a lowered position, while awaiting the new haul truck.

Alternatively, if the overlap and/or coverage of the truck bed with the determined dump zone does not meet or otherwise satisfy the threshold, then method 400 proceeds to step 416, in which controller 152 initiates an exception process. For example, if the maximum overlap and/or coverage between bed 108 and dump zone 204, 206 was, at one point, satisfactory, but the truck/driver was too slow to stop haul truck 106, machine 102 may signal the truck/driver to slowly reverse the approach (e.g., via a second number of honks, for example, two honks, or one or more other signals or indications). For example, if the approach involved driving haul truck 106 backwards, then reversing the approach would include driving haul truck 106 slowly forwards. Likewise, if the approach involved driving haul truck 106 forwards (e.g., in a drive-by approach), the reversing the approach would include driving haul truck 106 slowly backwards in reverse. In this aspect, method 400 may then return to step 408 and perform the remaining steps of method 400. Alternatively, if the maximum overlap and/or coverage between bed 108 and dump zone 204, 206 was never satisfactory during the approach of haul truck 106 to machine 102 (e.g., haul truck 106 substantially missed dump zone 204, 206), machine 102 may signal the truck/driver to retry the approach (e.g., via a third number of honks, for example, three honks, or one or more other signals or indications). In this aspect, the truck/driver may leave dump zone 204, 206 and retry the approach, for example, such that method 400 may then return to step 406 (e.g., after haul truck 106 is no longer visible via perception system(s) 134).

INDUSTRIAL APPLICABILITY

The present disclosure may be applicable in systems and methods for controlling an implement on a machine, such as, e.g., bucket 132 on machine 102, in order to deliver dug material into a transport machine, such as, e.g., haul truck 106. During operation, control system 150, including at least perception system(s) 134 and controller 152, and steps of method 400 may help to identify one or more dump zones 204, 206, for example, that are safe and accessible for machine 102 and haul truck 106. Aspects of control system 150, for example, perception system(s) 134 and/or controller 152, may be incorporated on machine 102, and may use one or more elements on machine 102 (e.g., horn(s), light(s), or other on-board signaling devices) to signal one or more haul trucks 106. Control system 150 and steps of method 400 may help to position haul truck 106 in an optimal or desired position within one of dump zones 204, 206. Moreover, control system 150 and steps of method 400 may help to ensure that haul truck 106 is appropriately positioned within one of dump zones 204, 206, which may help to ensure that material is dumped from bucket 132 into bed 108 and not on cab 136 or otherwise outside of bed 108. In these aspects, control system 150 and steps of method 400 may help to reposition haul truck 106 (e.g., forward or backward) and/or one or more of machine body 120, linkage assembly 130 (e.g., extending or retracting one or more portions of linkage assembly 130), and/or bucket 132 to ensure that bucket 132 and bed 108 of haul truck 106 are appropriate positioned relative to each other. Furthermore, control system 150 and steps of method 400 may help to evaluate the position of haul truck 106, for example, repositioning haul truck 106 or retrying the approach of haul truck 106 based on whether the position of bed 108 and its overlap with dump zones 204, 206 is above or below a threshold. Control system 150 and steps of method 400 may at least partially automate the truck spotting and positioning process, which may alleviate one or more operators of the labor intensive and/or time consuming process. Furthermore, control system 150 and steps of method 400 may allow for machine 102 to perform a plurality of digging and dumping cycles, for example, in an autonomous operation mode or in semi-autonomous operation mode.

It will be apparent to those skilled in the art that various modifications and variations can be made to the disclosed system without departing from the scope of the disclosure. Other embodiments of the disclosure will be apparent to those skilled in the art from consideration of the specification and practice of the invention disclosed herein. It may be intended that the specification and examples be considered as exemplary only, with a true scope and spirit of the invention being indicated by the following claims.

What is claimed is:

1. A control system for a machine, comprising:
a machine body;
a linkage assembly;
an implement coupled to the machine body via the linkage assembly;
one or more perception systems on the machine; and
a controller in communication with the one or more perception systems, wherein the controller is configured to:
receive one or more signals defining a dig region;
define one or more dump regions based at least on the dig region and information from the one or more perception systems; and
identify a position of a haul truck relative to the defined one or more dump regions.

2. The control system of claim 1, wherein the one or more dump regions correspond to the implement and the linkage assembly being rotated, via rotation of the machine body relative to an undercarriage, relative to the dig region, and wherein identifying the position of the haul truck includes determining dimensions of a bed of the haul truck and a midline of the bed.

3. The control system of claim 2, wherein the controller is configured to determine a dump line in the bed of the haul truck and wherein the dump line extends from a position spaced away from a cab of the haul truck to a position spaced away from a rear end of the bed.

4. The control system of claim 2, wherein the controller is further configured to calculate an overlap between the determined dimensions of the bed and the defined one or more dump regions.

5. The control system of claim 4, wherein if the calculated overlap or rate of change of the overlap between the determined dimensions of the bed and the defined one or more dump regions meet one or more thresholds, the controller is configured to initiate a plurality of dump and dig cycles to fill the bed of the haul truck.

6. The control system of claim 5, wherein if the calculated overlap between the determined dimensions of the bed and the defined one or more dump regions does not meet the one or more thresholds, the controller is configured to initiate an exception process that includes signaling the haul truck to reposition the haul truck relative to the machine.

7. The control system of claim 1, wherein the one or more perception systems includes one or more of a light detection and ranging systems (LIDAR) or a stereo camera positioned on one or more of the implement or the machine body.

8. The control system of claim 1, wherein the implement is a bucket, and wherein the bucket is positionable by extending or retracting one or more portions of the linkage assembly and/or rotating the machine body relative to an undercarriage.

9. A method of operating a machine with a bucket, comprising:

determining a dump zone, wherein determining the dump zone includes using one or more perception systems on the machine to define a dump zone within a range of the bucket;

positioning the bucket above a center of the dump zone;

calling a haul truck;

determining dimensions of a bed of the haul truck, and calculating an overlap and/or coverage of the bed of the haul truck with the determined dump zone;

signaling the haul truck to stop; and verifying that the overlap and/or coverage of the bed of the haul truck with the determined dump zone is above a threshold.

10. The method of claim 9, wherein the range of the bucket corresponds to a range of motion of a machine body relative to an undercarriage and a range of motion of a linkage assembly coupling the bucket to the machine body, wherein calling the haul truck includes actuating one or more communication device units on the machine a first number of times, and wherein signaling the haul truck to stop includes actuating the one or more communication device units on the machine the first number of times again.

11. The method of claim 10, wherein if the overlap and/or coverage of the truck bed with the determined dump zone or a rate of change of the overlap and/or coverage is above one or more thresholds, the method further comprises initiating a plurality of dump and dig cycles to fill the bed of the haul truck; and wherein if the calculated overlap between the determined dimensions of the bed and the determined dump zone does not meet the threshold, the method further comprises initiating an exception process that includes signaling the haul truck to reposition the haul truck relative to the machine.

12. The method of claim 11, wherein the exception process includes signaling the haul truck to reverse its approach, wherein signaling the haul truck to reverse its approach includes actuating the one or more communication device units on the machine a second number of times.

13. The method of claim 11, wherein the exception process includes signaling the haul truck to retry its approach, wherein signaling the haul truck to retry its approach includes actuating the one or more communication device units a third number of times.

14. The method of claim 9, wherein the bucket is coupled to a body of the machine by a linkage assembly, and wherein the method further includes repositioning the bucket relative to the dump zone by extending or retracting one or more portions of the linkage assembly relative to the body of the machine.

15. The method of claim 9, wherein the method further comprises:

before positioning the bucket above the center of the dump zone, loading the bucket with material from a dig zone; and when the bed of the haul truck is full, suspending autonomous digging and dumping to replace the haul truck with a new haul truck.

16. The method of claim 9, wherein the one or more perception systems includes one or more of a light detection and ranging systems (LIDAR) or a stereo camera positioned on one or more of the bucket or a machine body.

17. A digging machine, comprising:

an undercarriage;

a machine body, wherein the machine body is rotatable relative to the undercarriage;

a linkage assembly;

a bucket movably coupled to the machine body via the linkage assembly;

at least one perception system on the digging machine, wherein one of the at least one perception system is positioned on the machine body or on the linkage assembly; and a controller in communication with the at least one perception system, wherein the controller is configured to:

receive one or more signals defining a dig region;

define one or more dump regions based at least on the dig region and information from the at least one perception system, wherein the one or more dump regions correspond to the bucket and the linkage assembly being rotated, via rotation of the machine body relative to the undercarriage, relative to the dig region; and identify and evaluate a position of a haul truck relative to the defined one or more dump regions.

18. The digging machine of claim 17, wherein identifying and evaluating the position of the haul truck includes determining dimensions of a bed of the haul truck and a midline of the bed, wherein the controller is configured to determine a dump line in the bed of the haul truck, and wherein the dump line extends from a position spaced away from a cab of the haul truck to a position spaced away from a rear end of the bed.

19. The digging machine of claim 18, wherein the controller is further configured to calculate an overlap between the determined dimensions of the bed and the defined one or more dump regions or a rate of change of the overlap, wherein if the calculated overlap or rate of change of the calculated overlap between the determined dimensions of the bed and the defined one or more dump regions meets a threshold, the controller is configured to initiate a plurality of dump and dig cycles to fill the bed of the haul truck, and wherein if the calculated overlap between the determined dimensions of the bed and the defined one or more dump regions does not meet the threshold, the controller is configured to initiate an exception process that includes signaling the haul truck to reposition the haul truck relative to the digging machine.

20. The digging machine of claim 19, wherein the at least one perception system includes one or more of a light detection and ranging systems (LIDAR) or a stereo camera.

* * * * *